United States Patent [19]

Hirs

[11] Patent Number: 4,673,425

[45] Date of Patent: Jun. 16, 1987

[54] DISPOSABLE LINER FOR PAINT BOOTH GRATING

[76] Inventor: Gene Hirs, 6865 Meadowlake Rd., Birmingham, Mich. 48010

[21] Appl. No.: 906,482

[22] Filed: Sep. 12, 1986

[51] Int. Cl.[4] .............................................. B01D 45/08

[52] U.S. Cl. ........................................ 55/435; 55/436; 55/444; 55/446; 55/DIG. 46

[58] Field of Search .................... 52/127.2, 127.8, 145, 52/421, 476, 477, 514, 743, 741, 792, 794, 808; 55/435, 436, 444–446, DIG. 46, 448

[56] References Cited

U.S. PATENT DOCUMENTS

| | | | |
|---|---|---|---|
| 647,827 | 4/1900 | Gaillaumer | 55/446 X |
| 1,669,602 | 5/1928 | Daaks | 55/446 X |
| 3,641,983 | 2/1972 | Keen et al. | 119/17 |
| 4,023,530 | 5/1977 | Cobb | 119/17 |
| 4,440,554 | 4/1984 | Perry | 55/435 X |

*Primary Examiner*—Charles Hart

*Attorney, Agent, or Firm*—Cullen, Sloman, Cantor, Grauer, Scott & Rutherford

[57] ABSTRACT

An inexpensive, disposable liner is shaped and dimensioned to conform to the hole spacings of a grid-like grating used as the floor of a paint spray booth. The liner shields the grating surfaces from airborne or spilled paint, while having holes to permit the necessary airflow through the grating. When the paint build-up on the liner significantly occludes the holes, the liner is removed and disposed of, and replaced by a clean one.

1 Claim, 3 Drawing Figures

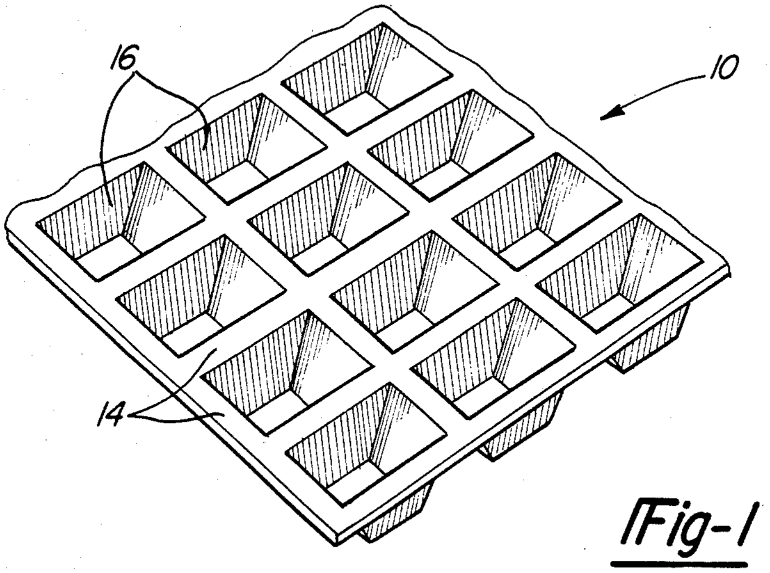
Fig-1
Fig-2
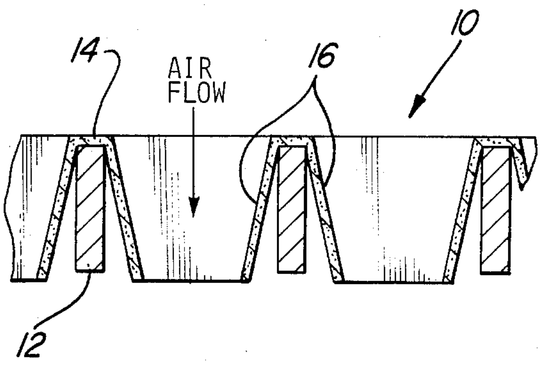
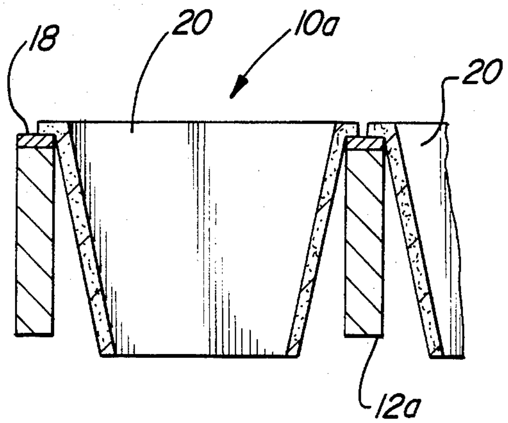
Fig-3

DISPOSABLE LINER FOR PAINT BOOTH GRATING

BACKGROUND OF INVENTION

This invention involves a disposable protective liner for gratings such as are commonly found in paint spray booths of the type typically employed in automotive assembly plants. However, it is to be understood that the present invention is equally adaptable to protective liners for gratings in any other field of application where the grating must remain porous to airflow in an environment where the grating is exposed to a gradual build-up of a contaminant coating as a result of airborne contaminants or spillage and the like.

In paint spray booths, it is common to have the flooring in the form of a grating or grid-like structure which permits airflow to pass through it so that airborne overspray paint can be directed to a wet type of air scrubber or other type of filter system to remove the paint from the air. The structure of the grating inevitably receives a gradual accumulation of the airborne paint, with the result that the grating openings are gradually reduced in size to the point that adequate airflow therethrough is no longer possible. This problem requires the periodic removal and cleaning of the grating by a paint stripping process that necessarily imposes a time, space and cost penalty on the operator of the facility.

Accordingly, it is the primary object of the present invention to provide an improved means of maintaining adequate airflow through a grating type of structure which is exposed to a gradual build-up of difficult to remove contaminants on its surfaces.

Two prior art patents show covers or mats for wire screens but intended to act as spacers rather than disposable contamination shields for the underlying screen to maintain air flow therethrough. In Cobb, U.S. Pat. No. 4,023,530, a molded cover for a hen-house cage floor is designed to interfit with the screen to prevent contact between the rusted screen and the hens or eggs, or to prevent formation of rust in the first instance. Cobb is not concerned with the problem of diminished air flow through the screen, in that the excrement may be readily removed (see col. 1, lines 22–27). Nor does Cobb have to replace his covers due to any build-up thereon. Similarly, the patent to Keen, U.S. No. 3,641,983, shows a spacer mat for a screen-like poultry cage floor. Keen's mat does not have openings corresponding with the screen opening spacing, and such mat is intended to be washable rather than disposable.

SUMMARY OF THE INVENTION

The method of the present invention involves the use of a disposable perforated liner or cover which is applied to the grating and which is configured to block airborne contaminants from being deposited upon the surfaces of the grating. The liner is inexpensively fabricated from thin molded materials, such as wood fiber or cardboard slurry, each in combination with a phenolic resin binder. The liner may be very thin, because it need not support any load, but must be thick enough to be capable of maintaining its shape during handling prior to application to the grating.

When difficult to remove contaminants have built up upon the liner surfaces to the point that the airflow through the openings of the liner is inadequate, the liner is simply disposed of and a clean one applied in its place.

BRIEF DESCRIPTION OF THE DRAWINGS

FIG. 1 is a perspective view of a first embodiment of the liner of the present invention.

FIG. 2 is a fragmentary cross-sectional elevation showing the liner of FIG. 1 in place on a supporting grating.

FIG. 3 is a view similar to FIG. 2 but showing a modified form of the invention.

DETAILED DESCRIPTION OF THE INVENTION

Referring to FIGS. 1 and 2 of the drawings, there is shown a disposable liner which is configured to conform to the shape and dimensions of a conventional grating 12 having generally rectangular openings. The grating may be made of metal or plastic such as polyethylene structural foam. The grating is typically a grid-like structure having perpendicularly intersecting structural members which define rectangularly shaped openings. In the context of a paint spray booth, an airstream carrying excess paint flows downwardly through the grating to a wet scrubber or other type of filtration system intended to remove the paint from the air.

The liner may be made of a combination of phenolic resin binder in conjunction with either a cardboard slurry or wood fiber. The thickness is preferably in the range of one-sixteenth to one-eighth of an inch, sufficient to generally hold its shape during storage and handling so that it can be quickly and readily applied to the grating.

Liner 10 comprises flat portions 14 which are dimensioned and spaced to rest upon the top surfaces of the structural members of grating 12, and a plurality of open-bottomed, generally cup-shaped formations 16 which are dimensioned to nest down into the openings of grating 12. Thus, the top and side surfaces of the grating are protected from airborne contaminants by the corresponding surfaces of the liner.

When the build-up of paint or other contaminants reaches a point that the airflow through the grating is substantially impeded, the liner can be simply and quickly removed and disposed of, and a clean replacement liner applied to the grating.

An alternative embodiment of the present invention is illustrated in FIG. 3. Liner **10*a* may be fabricated of a flat cardboard panel 18 which has holes punched through it of a dimension and spacing to conform to the openings in grating 12*a*. Separately formed cup-like inserts 20 are then pushed through the openings in the flat perforated liner element 18. A small lip is provided at the top of each insert 20 to retain it in the desired position in the opening of liner 18. If necessary, these inserts 20 can be glued to the flat element 18. The same choice of materials as described above with reference to the embodiment of FIGS. 1 and 2 can be used for the elements of the FIG. 3** embodiment.

Preferably, the liners of both embodiments would be self-supporting and approximately 48 inches square. As seen in the figures, they are shaped so that they can nest to permit convenient stacking for storage and shipping.

This invention may be further developed within the scope of the following claims. Accordingly, the above specification is to be interpreted as illustrative of only two operative embodiments of the present invention, rather than in a strictly limited sense.

I now claim:

1. A method of protecting the surfaces of a grating against build-up of airborne or spilled contaminants which are not easily removable, while maintaining the porosity of the grating to airflow, which comprises the steps of:

applying a disposable molded cover to the upstream side of the grating, said cover having a plurality of formations which are shaped and dimensioned so that each formation will nest into one of the respective openings of the grating and will project into such opening a sufficient distance to act as a protective barrier to prevent airborne contaminants from coming into contact with the grating, each of said formations having a hole which allows airflow through the cover formation and through the associated grating openings;

and removing said cover from the grating when the holes have become sufficiently occluded to interfere with adequate airflow through the covered grating, and installing a clean replacement cover on the grating.

* * * * *